United States Patent
Ding et al.

(10) Patent No.: US 12,147,247 B2
(45) Date of Patent: Nov. 19, 2024

(54) VEHICLE ATTITUDE ESTIMATION METHOD, ELECTRONIC DEVICE AND STORAGE MEDIUM

(71) Applicant: Beijing Baidu Netcom Science Technology Co., Ltd., Beijing (CN)

(72) Inventors: Haodong Ding, Beijing (CN); Liangjun Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 252 days.

(21) Appl. No.: 17/884,136

(22) Filed: Aug. 9, 2022

(65) Prior Publication Data
US 2023/0266773 A1    Aug. 24, 2023

(30) Foreign Application Priority Data
Feb. 23, 2022    (CN) .......................... 202210166170.1

(51) Int. Cl.
G05D 1/00    (2024.01)
(52) U.S. Cl.
CPC .......... G05D 1/0891 (2013.01); G05D 1/0088 (2013.01)
(58) Field of Classification Search
CPC .................................................... G05D 1/0891
See application file for complete search history.

(56) References Cited

U.S. PATENT DOCUMENTS

| | | | | |
|---|---|---|---|---|
| 10,846,818 | B2 * | 11/2020 | Kanzawa | ............... G06V 20/58 |
| 11,138,756 | B2 * | 10/2021 | Cai | ......................... G06V 20/64 |
| 11,176,674 | B2 * | 11/2021 | Diankov | ................... G06T 7/11 |
| 11,200,685 | B2 * | 12/2021 | Kong | .................... G06T 17/005 |

(Continued)

FOREIGN PATENT DOCUMENTS

| | | |
|---|---|---|
| CN | 111797734 A | 10/2020 |
| CN | 114612665 A | 6/2022 |
| JP | 2021188258 A | 12/2021 |

OTHER PUBLICATIONS

Zhao, Huijing et al.; Detection and Tracking of Moving Objects at Intersections Using a Network of Laser Scanners; IEEE Transactions On Intelligent Transportation Systems; vol. 13, No. 2; Jun. 1, 2012.

(Continued)

*Primary Examiner* — Michael A Berns
(74) *Attorney, Agent, or Firm* — Faegre Drinker Biddle & Reath LLP

(57) ABSTRACT

Provided are a vehicle attitude estimation method, an electronic device and a storage medium, relates to a technical field of data processing, and in particular to fields of automatic driving, intelligent transportation, Internet of Things, big data and the like. A specific implementation solution includes: obtaining first target data, based on point cloud data of a vehicle, the first target data being capable of constituting a target surface of the vehicle; performing attitude estimation on a target body for surrounding the vehicle, based on the first target data, to obtain an estimation result; and estimating an attitude of the vehicle, based on the estimation result. According to the implementation solution, precise or accurate estimation of the attitude of the vehicle may be achieved.

20 Claims, 7 Drawing Sheets

(56) References Cited

U.S. PATENT DOCUMENTS

| | | | |
|---|---|---|---|
| 11,644,834 B2* | 5/2023 | Ditty | G06F 15/7807 |
| | | | 701/23 |
| 12,067,765 B2* | 8/2024 | Yang | G06T 7/73 |
| 2020/0134828 A1 | 4/2020 | Diankov et al. | |
| 2020/0160542 A1 | 5/2020 | Kanzawa et al. | |
| 2020/0327690 A1 | 10/2020 | Cai et al. | |
| 2021/0213617 A1 | 7/2021 | Aguirre | |
| 2022/0051094 A1* | 2/2022 | Chentanez | G06N 3/04 |
| 2023/0266773 A1* | 8/2023 | Ding | G05D 1/0088 |
| | | | 701/1 |

OTHER PUBLICATIONS

Japanese Patent Office; Japanese Office Action; Japanese Application No. 2022-137742; 10 pages; dated Sep. 5, 2023.
European Patent Office; European Extended Search Report; EP Application No. 22190114.3; 18 pages; dated Jun. 12, 2023.

* cited by examiner

— Bounding box of the mining truck
☆ Desired point of the mining truck
◇ Support point of the desired point
✩ Support point of the plane
○ Body side 1 of the mining truck
● Body side 2 of the mining truck

VEHICLE ATTITUDE ESTIMATION METHOD, ELECTRONIC DEVICE AND STORAGE MEDIUM

CROSS-REFERENCE TO RELATED APPLICATIONS

The present application claims the priority from Chinese Patent Application No. 202210166170.1, filed with the Chinese Patent Office on Feb. 23, 2022, the content of which is hereby incorporated herein by reference in its entirety.

TECHNICAL FIELD

The present disclosure relates to a technical field of data processing, and in particular, to technical fields of automatic driving, intelligent transportation, Internet of Things, big data and the like.

BACKGROUND

In an unmanned electric shovel scene, an unmanned electric shovel equipment may automatically drive to the vicinity of a mining truck based on attitude information of the mining truck, so as to automatically load excavated objects such as a coal mine onto the mining truck, thereby realizing autonomous loading. It may be seen that how to achieve precise or accurate estimation of an attitude of a vehicle has become an urgent technical problem to be solved in unmanned operation scenes.

SUMMARY

The present disclosure provides a vehicle attitude estimation method and apparatus, a device and a storage medium.

According to one aspect of the present disclosure, provided is a vehicle attitude estimation method, including: obtaining first target data, based on point cloud data of a vehicle, the first target data being capable of constituting a target surface of the vehicle; performing attitude estimation on a target body for surrounding the vehicle, based on the first target data, to obtain an estimation result; and estimating an attitude of the vehicle, based on the estimation result.

According to another aspect of the present disclosure, provided is a vehicle attitude estimation apparatus, including: a first obtaining unit configured to obtain first target data, based on point cloud data of a vehicle, the first target data being capable of constituting a target surface of the vehicle; a second obtaining unit configured to perform attitude estimation on a target body for surrounding the vehicle, based on the first target data, to obtain an estimation result; and an estimation unit configured to estimate an attitude of the vehicle, based on the estimation result.

According to another aspect of the present disclosure, provided is an electronic device, including: at least one processor; and a memory communicatively connected to the at least one processor, the memory stores an instruction executable by the at least one processor, and the instruction is executed by the at least one processor to cause the at least one processor to execute the above method of the present disclosure.

According to another aspect of the present disclosure, provided is a non-transitory computer-readable storage medium storing a computer instruction thereon, the computer instruction is used to enable a computer to execute the above method of the present disclosure.

According to another aspect of the present disclosure, provided is a computer program product including a computer program, the computer program implements the above method of the present disclosure when executed by a processor.

According to the present disclosure, precise or accurate estimation of the attitude of the vehicle may be achieved.

It should be understood that the content described in this part is not intended to identify crucial or important features of embodiments of the present disclosure, or to limit the scope of the present disclosure. Other features of the present disclosure will be easily understood from the following description.

BRIEF DESCRIPTION OF THE DRAWINGS

The accompanying drawings are used to better understand the present solution, and do not constitute a limitation to the present disclosure.

DETAILED DESCRIPTION

Figure 1:
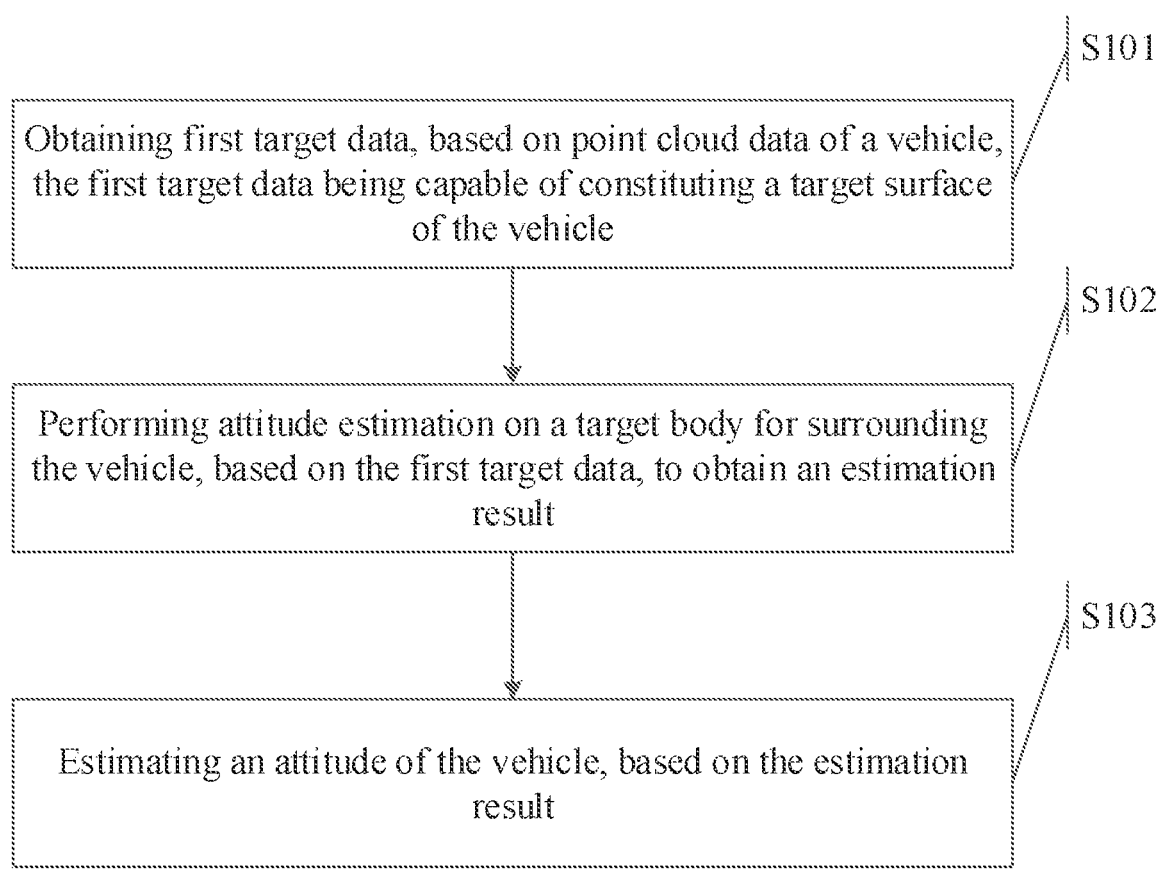
FIG. 1 is a first schematic diagram of an implementation flow of a vehicle attitude estimation method of the present disclosure.

The following describes exemplary embodiments of the present disclosure with reference to the accompanying drawings, includes various details of the embodiments of the present disclosure to facilitate understanding, and should be considered as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

The terms "first" and "second" herein refer to a plurality of similar technical terms and are used to distinguish these terms without limitation to an order of these terms or to only two terms. For example, first target data and second target data indicate two types of different target data or two different target data.

Before introducing the technical solution of the embodiments of the present disclosure, technical terms that may be used in the present disclosure will be further described.

1) Point cloud data, which is one set of sampling points with spatial coordinates acquired by a scanner such as a lidar, and due to a large number and density of the sampling points, the sampling points are usually regarded as the point cloud data. Each point in the point cloud data, that is each sampling point, is a three-dimensional coordinate (x, y, z), which is usually used to indicate an outer surface shape of an object corresponding to the sampling point.

2) Bounding box estimation: which is a bounding box estimation algorithm, that is a method to solve an optimal bounding space for a desired bounding object or discrete points characterized as the desired bounding object. The basic idea of the algorithm is to approximately replace a complex desired bounding object with a slightly larger and simpler geometry (called a bounding box).

In the technical solution of the present disclosure, the desired bounding object is a vehicle, and estimating a target body for surrounding the vehicle is to estimate a bounding box for surrounding the vehicle by using the bounding box estimation algorithm.

3) Region growth mode: which is a region growth algorithm, and is also called region increase algorithm. The basic idea of the region growth algorithm is to merge together points with similar properties, such as points in an image. For each region, one point is firstly designated as a seed starting point for regional growth or increase, and then other points in a field around the seed starting point are compared with the seed starting point, and other points with the similar properties are merged to continue to grow or increase outward until all points with the similar properties are included, and the regional growth or increase is completed.

The technical solution of the embodiments of the present disclosure may be applied to vehicles capable of automatic driving, such as private cars, buses, special vehicles, and the like. In an example, the special vehicles include trucks, lorries, logistics vehicles and other vehicles for performing specific transportation functions. The technical solution of the embodiments of the present disclosure may also be applied to a device capable of interacting with a vehicle, which may be any reasonable device that needs to know an attitude of the vehicle, such as other vehicles interacting with the vehicle, a platform for controlling and/or managing the attitude of the vehicle, and the like.

FIG. 1 is a schematic flowchart of a first embodiment of a vehicle attitude estimation method according to the embodiments of the present disclosure. As shown in FIG. 1, the method includes the following steps.

In S (step) 101, first target data is obtained, based on point cloud data of a vehicle, and the first target data is capable of constituting a target surface of the vehicle.

The point cloud data of the vehicle is obtained through scanning by a scanner such as a Lidar. The point cloud data of the vehicle scanned by the Lidar may be regarded as a point cloud image of the vehicle. The (first) target data capable of constituting the target surface of the vehicle is obtained based on the point cloud image of the vehicle. The first target data is a plurality of points constituting the target surface of the vehicle. Considering geometric characteristics of the vehicle, the vehicle roughly includes the following surfaces: a front surface, a rear surface, body sides (usually there are two body sides), a roof surface, etc. The target surface of the vehicle may be at least one of the aforementioned surfaces.

It may be understood that the Lidar is usually set at a position where the vehicle may be scanned. Due to a fixed scanning position of the Lidar, generally, the Lidar may only scan several, such as one or two, of the aforementioned surfaces. It is determined that which of the aforementioned surfaces the target surface of the vehicle in the present disclosure is, according to a scanning situation of the Lidar.

Under a situation that relative position and orientation between the Lidar and the vehicle do not change, the target surface of the vehicle is usually a surface of the vehicle that may be scanned by the Lidar at a position where the Lidar locates. In this way, the disclosed solution may be regarded as a solution for estimating an attitude of the vehicle based on the surface of the vehicle scanned by the Lidar. That is, using scanned geometric information of the vehicle to estimate the attitude of the vehicle may improve accuracy of estimating the attitude.

In S102, attitude estimation is performed on a target body for surrounding the vehicle, based on the first target data, to obtain an estimation result.

As mentioned above, the target body in this step is the aforementioned bounding box for surrounding the vehicle. An attitude estimation result of the bounding box is obtained by performing the attitude estimation on the bounding box for surrounding the vehicle through using the bounding box estimation algorithm based on the (first) target data capable of constituting the target surface of the vehicle.

It may provide a guarantee for the accuracy of estimating the attitude of the vehicle by estimating the bounding box based on the geometric information of the vehicle through using the (first) target data constituting the target surface of the vehicle to estimate the bounding box.

In S103, the attitude of the vehicle is estimated, based on the estimation result.

In this step, the attitude of the vehicle is estimated based on the estimation result of the bounding box.

In the aforementioned S101 to S103, the (first) target data constituting the target surface of the vehicle is used to perform the attitude estimation on the bounding box for surrounding the vehicle, and the attitude of the vehicle is estimated based on the estimation result. Because the target data constituting the target surface of the vehicle may reflect the geometric information of the vehicle itself, such as shape, size, and the like, precise or accurate estimation of the attitude of the vehicle may be achieved by using the geometric information of the vehicle to estimate the attitude of the vehicle.

In addition, obtaining the (first) target data constituting the target surface of the vehicle based on the point cloud data of the vehicle itself may ensure accuracy of the first target data, and then provide a certain basis for the subsequent precise estimation of the attitude of the vehicle.

In practical application, the vehicle has different corners, such as a corner between the body side and the rear surface, and a corner between the front surface and the body side. Each corner has a corresponding angle, such as a right angle, an obtuse angle, an acute angle, and the like. The edge of the corner may be regarded as a line for distinguishing different surfaces of the vehicle. Theoretically, if the edge of the corner is known, two surfaces connected by the corner in the vehicle may be distinguished, that is, points constituting the two surfaces in the point cloud data of the vehicle may be distinguished.

Figure 2:
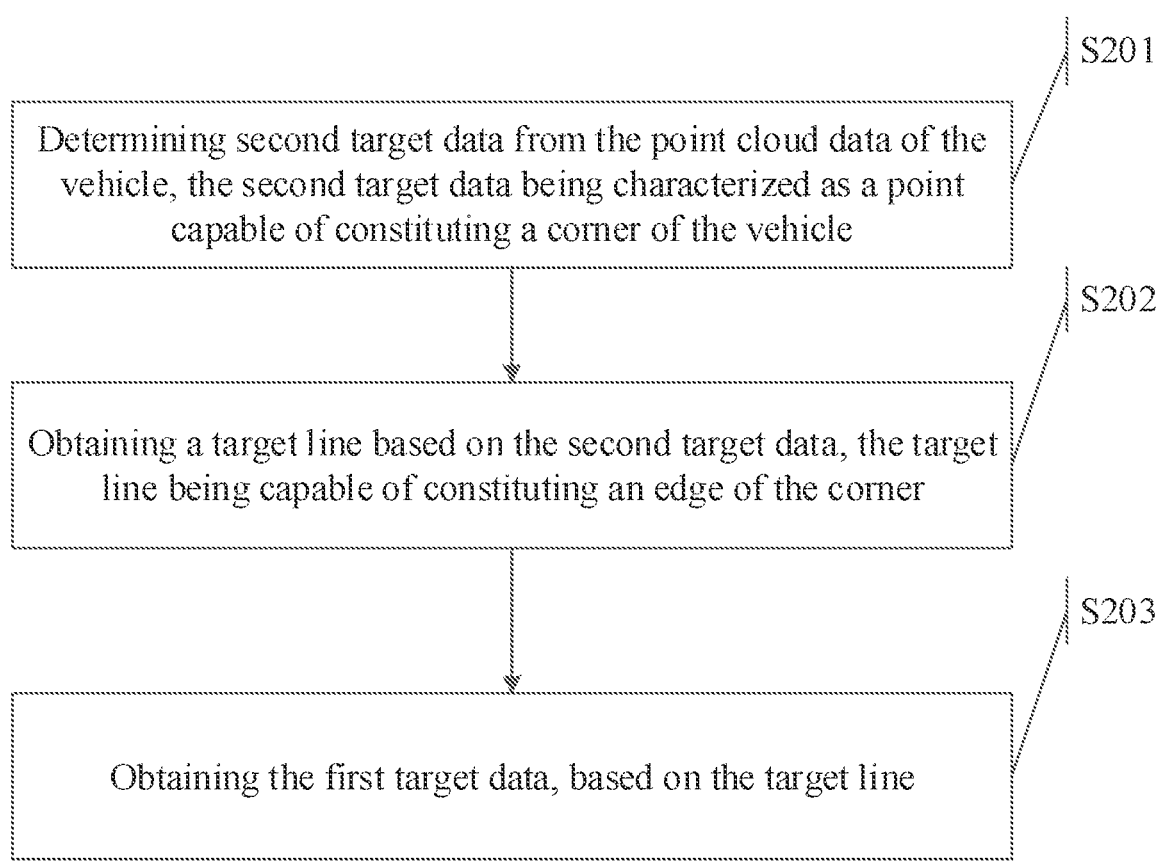
FIG. 2 is a second schematic diagram of an implementation flow of a vehicle attitude estimation method of the present disclosure.

Based on this, the aforementioned solution of obtaining the first target data based on the point cloud data of the vehicle may be realized based on the content shown in FIG. 2.

In S201, second target data is determined from the point cloud data of the vehicle, and the second target data is characterized as a point capable of constituting a corner of the vehicle.

This step is to determine the point constituting the corner of the vehicle from the point cloud data of the vehicle.

In S202, a target line is obtained based on the second target data, and the target line is capable of constituting the edge of the corner.

This step is to obtain the target line capable of constituting the edge of the corner based on the point constituting the corner of the vehicle.

In S203, the first target data is obtained based on the target line.

This step is to obtain the (first) target data constituting the target surface of the vehicle based on the target line.

In the solution shown in S201 to S203, the points capable of constituting the corner of the vehicle are determined from the point cloud data of the vehicle, the target line capable of constituting the edge of the corner is obtained based on the points constituting the corner of the vehicle, and the (first) target data constituting the target surface is obtained based on the target line. The aforementioned solution is equivalent to a solution of acquiring the target surface based on the target line constituting the edge of the corner. The solution may ensure accuracy of acquiring the target surface, and then provide guarantee for the subsequent estimation of the attitude of the vehicle.

It may be understood that the bounding box in the present disclosure is a directed bounding box, and estimating the bounding box is to estimate a center position and an orientation of the bounding box. In the present disclosure, the attitude of the vehicle is a posture of the vehicle, which includes information such as a position where the vehicle locates and an orientation of the vehicle.

Figure 3:
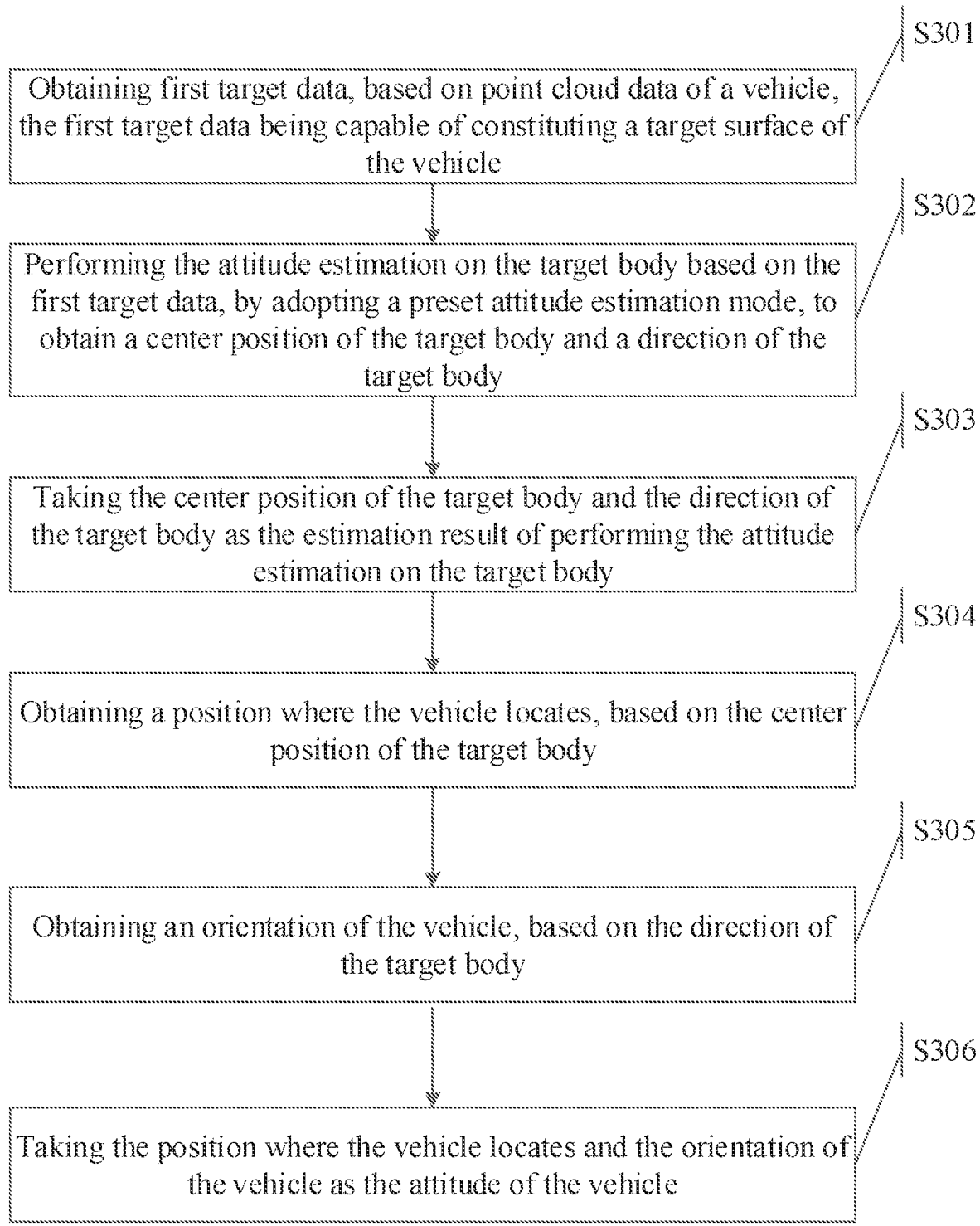
FIG. 3 is a third schematic diagram of an implementation flow of a vehicle attitude estimation method of the present disclosure.

Based on these, in the embodiments of the present disclosure, as shown in FIG. 3, the vehicle attitude estimation method includes the followings.

In S301, the first target data is obtained, based on the point cloud data of the vehicle, and the first target data is capable of constituting the target surface of the vehicle.

In S302, the attitude estimation is performed on the target body based on the first target data, by adopting a preset attitude estimation mode, to obtain the center position of the target body and the direction of the target body.

The preset attitude estimation mode includes but is not limited to at least one of a coordinate axis parallel bounding box estimation algorithm or a minimum bounding box estimation algorithm. It may ensure the accuracy of estimating the central position and the direction of the bounding box and then provide a guarantee for accurate estimation of a subsequent vehicle, by estimating the bounding box for surrounding the vehicle based on the first target data constituting the target surface of the vehicle through adopting the aforementioned bounding box estimation algorithm.

In S303, the center position of the target body and the direction of the target body are taken as the estimation result of performing the attitude estimation on the target body.

In S304, the position where the vehicle locates is obtained based on the center position of the target body.

In S305, the orientation of the vehicle is obtained based on the direction of the target body.

In S304 and S305, there is a certain relationship between the estimation result of the bounding box and the attitude of the vehicle. Exemplarily, the center position of the bounding box is the position where the vehicle locates, and the direction of the bounding box is opposite to or the same as the orientation of the vehicle. Alternatively, the position of the vehicle is obtained by converting the center position of the bounding box through a preset conversion method, and the orientation of the vehicle is obtained by converting the direction of the bounding box. The above description is only a specific example, and any reasonable situation is within the scope of the present disclosure.

In S306, the position where the vehicle locates and the orientation of the vehicle are taken as the attitude of the vehicle.

In an example, S302 to S303 may be used as a further description of performing the attitude estimation on the target body for surrounding the vehicle based on the first target data to obtain the estimation result. S304 to S306 may be used as a further description of estimating the attitude of the vehicle based on the estimation result. S304 and S305 have no strict sequence and may be performed simultaneously.

In the aforementioned S301 to S306, the position where the vehicle locates and the orientation of the vehicle are estimated based on the estimation result of the center position and the direction of the bounding box for surrounding the vehicle, so as to achieve the precise estimation of the attitude of the vehicle.

In the embodiments of the present disclosure, the solution for determining the second target data from the point cloud data of the vehicle includes the following two implementation solutions, and the determination of the second target data may be achieved by using either implementation solution.

Implementation solution a: a point whose normal satisfies an orthogonal requirement with normals of a plurality of other points within a first predetermined range from the point is selected from the point cloud data of the vehicle, where a number of the plurality of other points is greater than or equal to a first predetermined threshold; and the selected point is taken as the second target data.

In other words, in the implementation solution a, the second target data is a point in the point cloud data of the vehicle, and a normal of the point satisfies an orthogonal requirement with normals of a plurality of other points within a first predetermined range from the point. A quantity of the plurality of other points is greater than or equal to a first predetermined threshold.

In an example, that satisfy the orthogonal requirement may be regarded as satisfying an approximate orthogonal requirement. That satisfy the approximate orthogonal requirement means that an included angle between normals of two points is approximately a right angle, for example, the cosine of the included angle between the normals of the two points is less than a third predetermined threshold. The point constituting the corner of the vehicle need to satisfy the orthogonal requirement with enough other points (having the number greater than or equal to the first predetermined threshold).

In this way, accurate selecting of the points constituting the corner of the vehicle may be realized, and omission of the selecting of the points constituting the corner of the vehicle may be avoided.

Implementation solution b: a point whose normal satisfies the orthogonal requirement with the normals of the plurality of other points within the first predetermined range from the point is selected from the point cloud data of the vehicle, where the number of the plurality of other points is greater than or equal to a first predetermined threshold; the selected point is clustered to form at least two point-clusters; a target point-cluster is determined from the at least two point-clusters; and a point in the target point-cluster is taken as the second target data.

The implementation solution b is a further optimized solution of the implementation solution a. After selecting a point that satisfies the orthogonal requirement, the point is clustered, the target point-cluster is selected, and a point in the target point-cluster is taken as the point capable of constituting the corner of the vehicle.

In an example, the selected point may be clustered according to a preset clustering algorithm. The clustering algorithm includes but is not limited to at least one of a distance-based clustering algorithm, a density-based clustering algorithm or a cluster-center-based clustering algorithm. A point-cluster with the largest number of points is selected from the at least two point-clusters as the target point-cluster. In this way, accuracy of acquiring the points constituting the corner of the vehicle may be ensured.

The aforementioned use of clustering and the selection of the target point-cluster to achieve the acquisition of the points constituting the corner ensure the accuracy of acquiring the points constituting the corner of the vehicle, and then provide a guarantee for the accurate acquisition of the subsequent target line and the target surface.

According to one embodiment of the present disclosure, the solution of obtaining the target line based on the second target data may be realized in the following way in which the second target data is analyzed to determine a target length and a target center point, and the target line is obtained based on the target length and the target center point.

It may be understood that the edge of the corner of the vehicle is a line segment. If a center point and a length of the line segment may be known, the target line may be known. The length (the target length) and the center point (the target center point) of the target line constituting the edge of the corner may be known by using the analysis of the points constituting the corner obtained in the aforementioned implementation solution a or b, thereby realizing the acquisition of the target line constituting the edge of the corner. The solution is simple and easy in engineering, avoids complex operations, is a lightweight operation method, and saves operation costs.

According to one embodiment of the present disclosure, the solution of obtaining the first target data based on the target line may be realized in the following ways in which a target support point set is acquired, a target support point is obtained from the target support point set based on the target length of the target line and the target center point of the target line, and region growth processing is performed with the target support point as a starting point by adopting a preset region growth mode, to obtain the first target data capable of constituting the target surface of the vehicle.

In an example, the target support point set is a set of points in the point cloud data of the vehicle, and each of the points satisfies an orthogonal requirement with all of a plurality of points constituting the corner of the vehicle, where a quantity of the plurality of points is greater than or equal to a second predetermined threshold. That is, the points in the target support point set are the points, which meet the orthogonal requirement with enough (greater than or equal to the second predetermined threshold) points capable of constituting the corner of the vehicle, in the point cloud data of the vehicle. Accuracy of the points in the target support point set may ensure accuracy of obtaining the target support point and the accuracy of regional growth.

Please refer to the relevant descriptions for the meeting of the orthogonal requirement, and the repetition descriptions thereof will not be omitted.

Obtaining the target support point from the target support point set may ensure the accuracy of obtaining the target support point, and then provide a guarantee for the subsequent accurate regional growth.

Taking the target support point as the seed starting point for the region growth processing may select points with similar characteristics to the seed starting point, such as the points constituting the target surface of the vehicle as the target support point. This method not only provides a simple and easy way to acquire the first target data, and realizes the lightweight operation, but also ensures the accuracy of obtaining the first target data, thereby providing a certain guarantee for the accurate of the subsequent estimation of the attitude of the vehicle.

According to one embodiment of the present disclosure, the following solution is adopted to obtain the point cloud data of the vehicle.

Three-dimensional point cloud data obtained for a target environment is acquired; a two-dimensional image obtained for the target environment is acquired; and the point cloud data of the vehicle is obtained based on the three-dimensional point cloud data and the two-dimensional image. At least the vehicle is in the target environment.

Exemplarily, the target environment is scanned three-dimensionally by using the Lidar to obtain the three-dimensional point cloud data for the target environment. An (a plane) image of the target environment is captured by using an image capturing unit such as a camera to obtain the two-dimensional image for the target environment.

In practical application, in addition to the vehicle, the target environment may also include any other reasonable objects such as ground, stone, and the like. In this way, the two-dimensional image and the three-dimensional point cloud data obtained for the target environment include not only the vehicle, but also the aforementioned other objects. Obtaining the point cloud data of the vehicle based on the three-dimensional point cloud data and the two-dimensional image may be regarded as a solution to accurately distinguish the point cloud data of the vehicle from point cloud data of the other objects by using the two-dimensional image. Thus, the accuracy of acquiring the point cloud data of the vehicle may be ensured, accurate basic data may be provided for the subsequent estimation of the attitude of the vehicle.

The technical solution of the embodiments of the present disclosure may be further described below in combination with the contents shown in FIG. 4 to FIG. 6.

Figure 4:
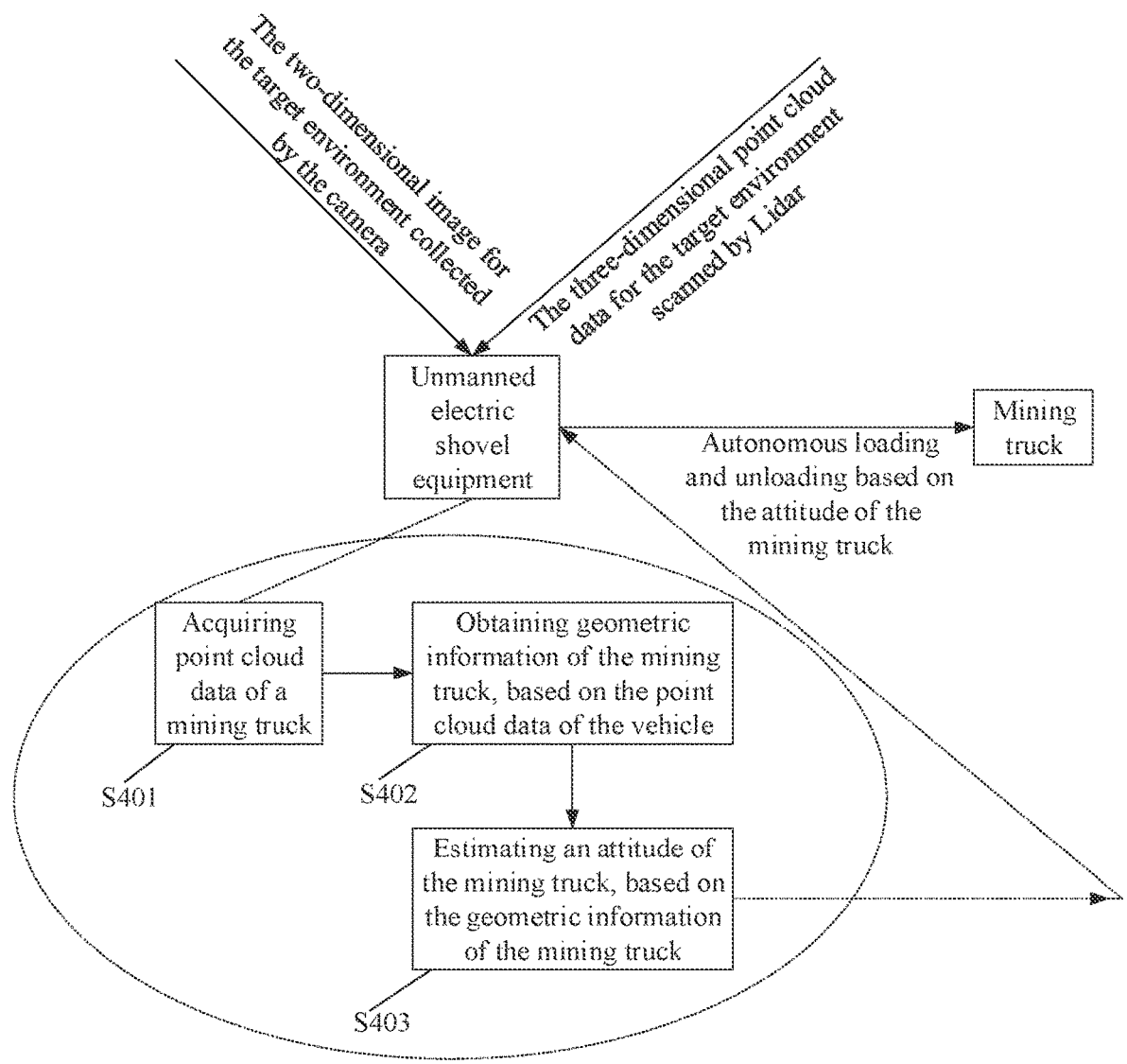
FIG. 4 is a schematic diagram of an application scene of the present disclosure.

In the present application scene, as shown in FIG. 4, taking an unmanned electric shovel operation scene and a vehicle as a mining truck as an example, the unmanned electric shovel equipment needs to know a position and an orientation of the mining truck in the work environment, and drive to the mining truck according to the known vehicle attitude, so as to realize autonomous loading.

As shown in FIG. 4, the vehicle attitude estimation solution of the present disclosure mainly the followings.

In S401, point cloud data of the mining truck is acquired.

In S402, geometric information of the mining truck is obtained based on the point cloud data of the mining truck.

In S403, an attitude of the mining truck is estimated based on the geometric information of the mining truck.

In S401 to S403, based on the geometric information of the mining truck, accurate or precise estimation of the attitude of the mining truck may be realized, and a problem of high operation costs caused by vehicle attitude estimation based on a deep learning algorithm in relevant technologies may be avoided. It is a low operation costs vehicle attitude estimation solution.

In an example, the geometric information of the mining truck is reflected by including but not being limited to a target surface of the mining truck, such as body sides.

Figure 5:
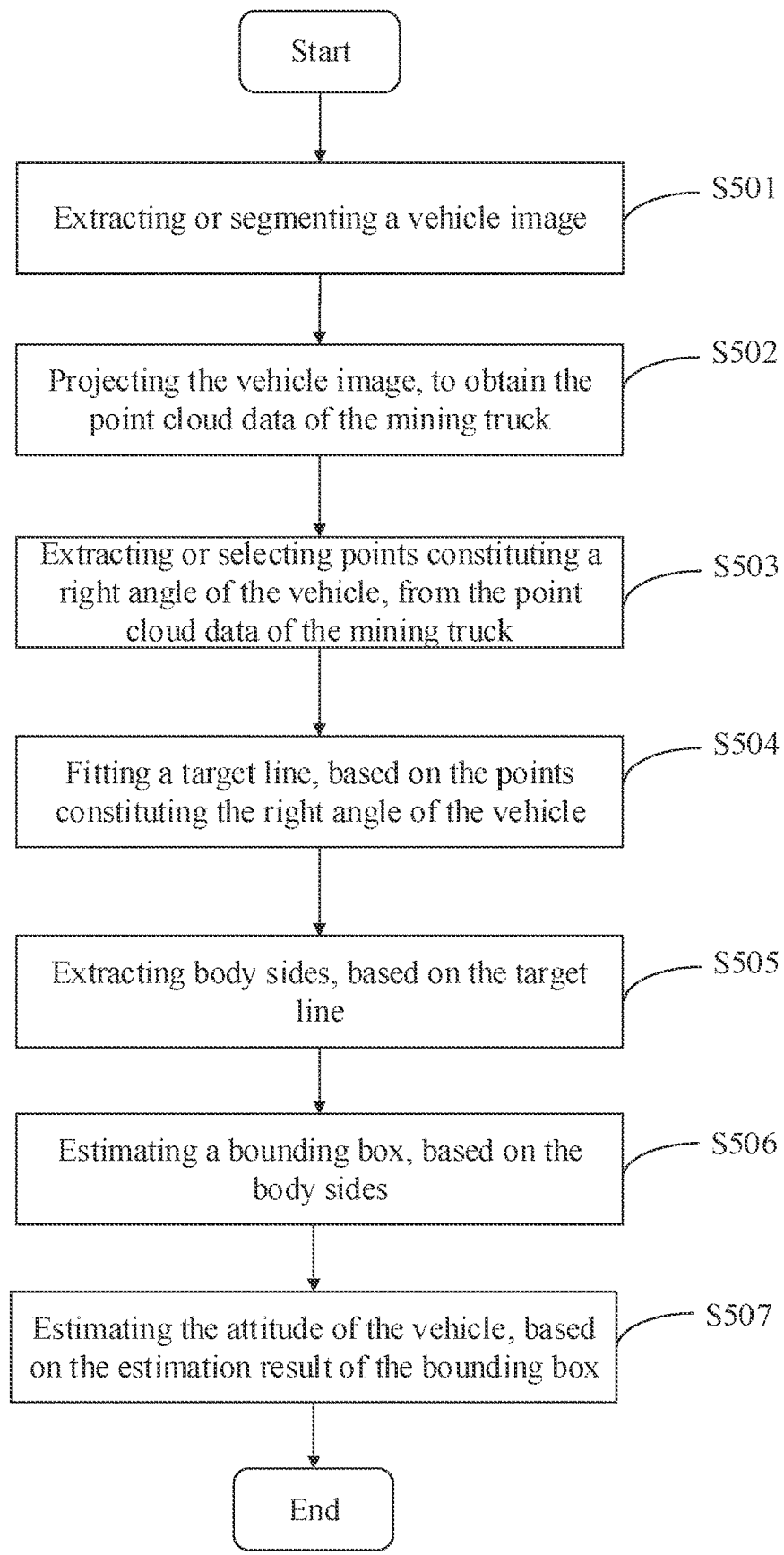
FIG. 5 is a fourth schematic diagram of an implementation flow of a vehicle attitude estimation method of the present disclosure.

For the implementation process of the above steps, please refer to the relevant description of the steps in FIG. 5 for details.

In the present application scene, a target environment is an environment where the unmanned electric shovel equipment and the mining truck equipment locate. The Lidar and the camera are installed at different positions of the unmanned electric shovel equipment. In an example, the Lidar is used to scan three-dimensional point cloud data of the environment where the mining truck locates at the position where the Lidar locates, and to obtain the three-dimensional point cloud data for the target environment. The camera is used to capture a plane image of the environment where the mining truck locates at the position where the capture locates, and to obtain a two-dimensional image for the target environment.

The unmanned electric shovel equipment obtains the point cloud data of the vehicle based on the three-dimensional point cloud data and the two-dimensional image obtained for the target environment. The aforementioned content is equivalent to a solution for selecting a target object such as the point cloud data of the vehicle from three-dimensional point cloud data including other objects such as ground.

The following is shown in combination with the contents shown in FIG. 5, the aforementioned solution may be specifically realized by the following solution in which a vehicle image is extracted or segmented from the two-dimensional image (S501). Because the vehicle image is obtained in a two-dimensional coordinate system, such as a camera coordinate system, the vehicle image is projected or mapped to a three-dimensional coordinate system of the three-dimensional point cloud data obtained for the target environment. Because the three-dimensional point cloud data is scanned by the Lidar, the three-dimensional coordinate system of the three-dimensional point cloud data may be regarded as a radar coordinate system. In a case where the two-dimensional vehicle image is projected or mapped to the radar coordinate system, point cloud data corresponding to the vehicle image in the three-dimensional point cloud data obtained for the target environment is the point cloud data of the vehicle. That is, the point cloud data of the mining truck is obtained (S502).

In this way, extracting or segmenting the point cloud data of the vehicle from the three-dimensional point cloud data obtained for the target environment is a solution of extracting or segmenting the point cloud data of the vehicle. The solution may accurately distinguish the point cloud data of the vehicle from the point cloud data of the other objects, and provides accurate basic data for subsequent estimation of the attitude of the vehicle.

In an example, the vehicle image may be segmented or extracted from the two-dimensional image by using the depth learning algorithm.

The aforementioned solutions of S501 and S502 may be used as a further description of the solution of S401.

The aforementioned two-dimensional image is usually RGB (red, green and blue) image. The aforementioned solution of obtaining the point cloud data of the vehicle based on the three-dimensional point cloud data and the two-dimensional image obtained for the target environment may be regarded as a solution of obtaining the point cloud data of the vehicle by using fusion of the RGB image and the three-dimensional point cloud data. It is easy to be implemented in engineering and has strong practicability.

In practical applications, the corner of the vehicle may be regarded as a right angle. Points capable of constituting the right angle of the vehicle are selected or extracted from the point cloud data of the vehicle (S503). For convenience of description, the points constituting the right angle of the vehicle are regarded as desired points.

For each point in the point cloud data of the mining truck, included angles between a normal of each point and normals of other points within a radius (r) (the first predetermined range) from the point are calculated. For details, please refer to the inner product formula between normals (1).

$$\cos\theta = n1 \cdot n2 \qquad (1)$$

In an example, n1 is a normal of a point in the point cloud data; n2 is a normal of a point within the radius (r) from the above point; and θ is an included angle between the normals of the two points. In an example, a value of the radius (r) is preset. The cosine value of the included angle between the normals may improve calculation speed, and then save the operation costs.

When the cos θ is less than or equal to the third predetermined cosine threshold, such as 0.2, the normals of the two points may be considered to be approximately orthogonal, meet the orthogonal requirement. The two points whose normals are approximately orthogonal are taken as one point-pair. If a number of point-pairs consisting of a point and points approximately orthogonal to the point's normal within the radius (r) from the point is greater than or equal to the given first predetermined threshold, the point is considered as a suspected desired point. That is, the point may or may not be the point constituting the right angle of the vehicle.

All suspected expected points are selected or extracted from the point cloud data of the vehicle. The Euclidean distance-based clustering method is adopted to cluster all the suspected expected points to form two or more point-clusters. A point-cluster with the largest number of points is selected as the target point-cluster, and points in the target point-cluster may be used as the points constituting the right angle of the vehicle. Accurate acquisition of the points constituting the corner of the vehicle is achieved, and a guarantee for subsequent accurate acquisition of a target line is provided.

Usually, one mining truck right angle corresponds to one target point-cluster, and several target point-clusters corresponding to several mining truck right angles may be obtained from the point cloud data of the vehicle, which depends on a relative position relationship between the Lidar and the mining truck when the Lidar is scanning the mining truck. Generally, one or two mining truck right angle will be scanned.

In addition, for the point whose normal is approximately orthogonal to normals of the desired points, if the normal of a point is approximately orthogonal to the normals of a plurality of desired points, such as having a number greater than or equal to the second predetermined threshold, the point is regarded as a support point of the desired points. Assemble support points of the desired points to obtain the target support point set, and save it for subsequent use.

In an example, the first predetermined threshold, the second predetermined threshold and the third predetermined threshold may be the same in numerical value, such as 50. Of course, the three predetermined thresholds may also be different. For example, the first predetermined threshold is 70, the second predetermined threshold is 50, and the third predetermined threshold is 20. In the solution, a size relationship among the three predetermined thresholds is not limited.

Next, a target line capable of constituting an edge of the right angle is fit based on the points constituting the right angle of the vehicle (S504). Principal component analysis (PCA) is adopted to analyze the points in the target point-cluster to obtain an eigenvector corresponding to the maximum eigenvalue. A direction indicated by the eigenvector is a direction of the edge of the right angle (i.e., a direction of the target line). In the radar coordinate system (XYZ coordinate system), the maximum x, maximum y and maximum z, and the minimum x, maximum y and maximum z, are found in the direction of the target line. The minimum x is subtracted from the maximum x, and the minimum y is subtracted from the maximum y, the minimum z is subtracted from the maximum z, and the target length is obtained by taking a square root of a sum of squares of the three differences, the target length is the length of the target line. A center of the target point-cluster is the (target) center point of the target line. Based on the center and the target length of the target point-cluster, the target line capable of constituting the edge of the right angle is fitted. Accurate fitting of the target line is achieved.

In practical application, considering that a number of right angles scanned by the Lidar may be one, two or other reasonable numbers, a number of the target line may be one, two or other reasonable numbers, and it depends on an actual situation scanned by the Lidar.

Next, a flow of extracting the body sides based on the target line is executed (S505).

Within a range with the center point of the target line as a center and ⅔ of the length of the target line as a radius, it is determined whether a point may be searched from the target support point set, and if the point may be searched, the searched point will be regarded as the target support point. The target support point may be used as a plane support point of the target line to subsequently obtain the target surface of the vehicle or the points constituting the target surface. In this way, accurate acquisition of the plane support point may be achieved, and accurate basic data may be provided for the subsequent estimation of the attitude of the vehicle. The aforementioned radius may also be any numerical value greater than or equal to ½ of the length of the target line and less than the length of the target line, without specific limitation.

Then, all points constituting the two body sides are obtained by performing the region growth processing from the point cloud data of the entire scene (the three-dimensional point cloud data obtained for the target environment) with the target support point as a starting point though adopting the preset region growth mode. An area constituted by all the points of each body side is the body side of the mining truck. Accurate acquisition of the points constituting the body side may be achieved, and the accurate basic data may be provided for subsequent estimation of the attitude of the vehicle.

The aforementioned solution may be regarded as a solution of extracting or segmenting the two body sides of the mining truck from the point cloud data of the whole scene. In addition, the body sides of the mining truck may also be extracted or segmented from part of the point cloud data that is the point cloud data of the vehicle in the point cloud data of the whole scene. Compared with extracting or segmenting the body sides of the mining truck from the point cloud data of the vehicle, extracting or segmenting from the point cloud data of the whole scene may avoid a problem that the body sides cannot be successfully extracted or extracted incomplete due to incomplete point cloud data of the vehicle.

The aforementioned S503 to S505 may be used as a further description of S402. The solutions of S503 to S505 are executed in the radar coordinate system.

Next, a flow of estimating the bounding box based on the body sides is executed (S506).

Because the bounding box is used to surround the mining truck, the estimation of the bounding box needs to be performed in a vehicle coordinate system. The present flow needs to build the vehicle coordinate system based on the body sides, and estimate the central position and direction of the bounding box in the vehicle coordinate system.

Further, the body sides are plane, and normals of the two body sides are obtained. The normals include sizes and directions. Specifically, in order to improve the calculation speed, synthetic directions of the normal of each point in the body sides are calculated, and the synthetic directions are used as the normal directions of the body sides. The normal sizes of the body sides are 1. A vector is obtained by performing cross-product on the normals of the two body sides. A coordinate system composed of the vector and the normals of the two body sides is the vehicle coordinate system. In the vehicle coordinate system, for the two body sides or the points constituting the body sides, the coordinate axis parallel bounding box algorithm is adopted to estimate the central position and direction of the bounding box. Accurate estimation of the central position and the direction of the bounding box may be achieved.

Finally, a flow of estimating the attitude of the vehicle based on an estimation result of the bounding box is executed (S507).

According to a mapping relationship between the radar coordinate system and the vehicle coordinate system, the estimated result of the bounding box in the vehicle coordinate system is transformed into the radar coordinate system, and thus the position and orientation of the vehicle in the radar coordinate system may be obtained. In the radar coordinate system, the solution for obtaining the position and direction of the vehicle according to the center position and the direction of the bounding box, please refer to the aforementioned relevant description, and will not be repeated.

The aforementioned S506 to S507 may be used as a further description of S403.

It may be understood that in practical application, the unmanned shovel equipment has its own coordinate system. If the coordinate system of the unmanned electric shovel electric equipment is different from the radar coordinate system, it is also necessary to convert the position and the direction of the vehicle obtained in the radar coordinate system to the coordinate system of the unmanned electric shovel equipment. In this way, the unmanned electric shovel equipment may accurately know the attitude of the mining truck, and then drive to the mining truck to realize the autonomous loading and unloading of the unmanned electric shovel equipment without manual intervention.

Figure 6:
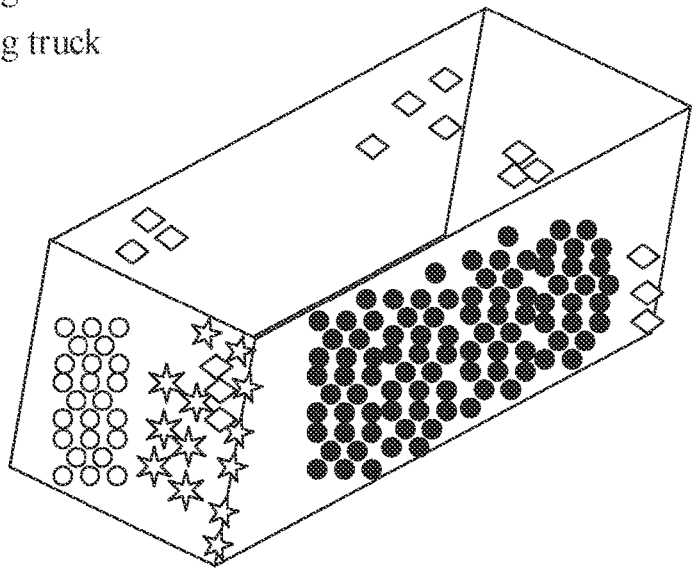
FIG. 6 is a visual schematic diagram of an attitude estimation result of a vehicle of the present disclosure.

FIG. 6 is a visual schematic diagram of a vehicle attitude estimation result. In FIG. 6, different points are indicated by different symbols. In FIG. 1, the Lidar scans one right angle (indicated by ☆). The supporting points of the points constituting the right angle are indicated by symbols ◇. The plane support points are indicated by ✵. There are two body sides, one is side 1 indicated by the symbol ○, and the other is side 2 indicated by the symbol ●. The straight line part indicates the bounding box of the mining truck.

The aforementioned solution effectively completes the attitude estimation of the mining truck in an unmanned electric shovel working process, which is easy to realize in engineering. Compared with a solution of using a deep learning model to estimate the attitude of the mining truck in relevant technologies, it may greatly save the operation costs. Based on the geometric information of the vehicle, precise or accurate estimation of the attitude of the vehicle may be achieved.

Figure 7:
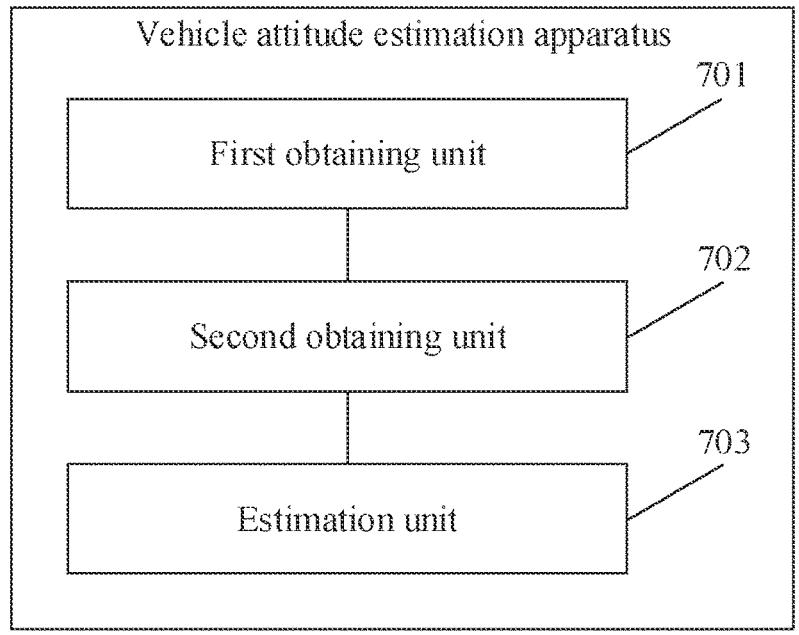
FIG. 7 is a structural diagram of a vehicle attitude estimation apparatus of the present disclosure.

The present disclosure also provides an embodiment of a vehicle attitude estimation apparatus, as shown in FIG. 7, the apparatus includes: a first obtaining unit 701 configured to obtain first target data based on point cloud data of a vehicle, the first target data is capable of constituting a target surface of the vehicle; a second obtaining unit 702 configured to perform attitude estimation on a target body for surrounding the vehicle based on the first target data to obtain an estimation result; and an estimation unit 703 configured to estimate an attitude of the vehicle based on the estimation result.

In an example, the first obtaining unit 701 is further configured to determine second target data from the point cloud data of the vehicle, and the second target data is characterized as a point capable of constituting a corner of the vehicle; obtain a target line based on the second target data, and the target line is capable of constituting an edge of the corner; and obtain the first target data based on the target line.

In an example, the second obtaining unit 702 is further configured to perform the attitude estimation on the target body based on the first target data, by adopting a preset attitude estimation mode, to obtain a center position of the target body and a direction of the target body; and take the center position of the target body and the direction of the target body as the estimation result.

In an example, the estimation unit 703 is further configured to obtain a position where the vehicle locates based on the center position of the target body; obtain an orientation of the vehicle based on the direction of the target body; and take the position where the vehicle locates and the orientation of the vehicle as the attitude of the vehicle.

In an example, the second target data is a point in the point cloud data of the vehicle, and a normal of the point satisfies an orthogonal requirement with normals of a plurality of other points within a first predetermined range from the point. A quantity of the plurality of other points is greater than or equal to a first predetermined threshold.

In an example, the first obtaining unit 701 is further configured to select a point from the point cloud data of the vehicle, a normal of the selected point satisfying an orthogonal requirement with normals of a plurality of other points within a first predetermined range from the selected point; where a quantity of the plurality of other points is greater than or equal to a first predetermined threshold; cluster the selected point to form at least two point-clusters; determine a target point-cluster from the at least two point-clusters; and take a point in the target point-cluster as the second target data.

In an example, the first obtaining unit 701 is further configured to analyze the second target data to determine a target length and a target center point; and obtain the target line based on the target length and the target center point.

In an example, the first obtaining unit 701 is further configured to acquire a target support point set; obtain a target support point from the target support point set, based on the target length of the target line and the target center point of the target line; and perform region growth processing with the target support point as a starting point by adopting a preset region growth mode, to obtain the first target data capable of constituting the target surface of the vehicle.

In an example, the target support point set is a set of points in the point cloud data of the vehicle, and each of the points satisfies an orthogonal requirement with all of a plurality of points constituting the corner of the vehicle. A quantity of the plurality of points is greater than or equal to a second predetermined threshold.

The apparatus further includes a third obtaining unit (which is not shown in FIG. 7) configured to acquire three-dimensional point cloud data obtained for a target environment; acquire a two-dimensional image obtained for the target environment; and obtain the point cloud data of the vehicle based on the three-dimensional point cloud data and the two-dimensional image. At least the vehicle is in the target environment.

It should be described that since the principle of solving the problem of the vehicle attitude estimation apparatus of the present disclosure is similar to the aforementioned vehicle attitude estimation method, the implementation process and implementation principle of the vehicle attitude estimation apparatus may be referred to the description of the implementation process and implementation principle of the aforementioned method, and the repetition descriptions thereof will be omitted.

In the technical solution of the present disclosure, acquisition, storage and application of a user's personal information involved herein are all in compliance with the provisions of relevant laws and regulations, and do not violate public order and good customs.

According to the embodiments of the present disclosure, the present disclosure also provides an electronic device, a readable storage medium and a computer program product.

Figure 8:
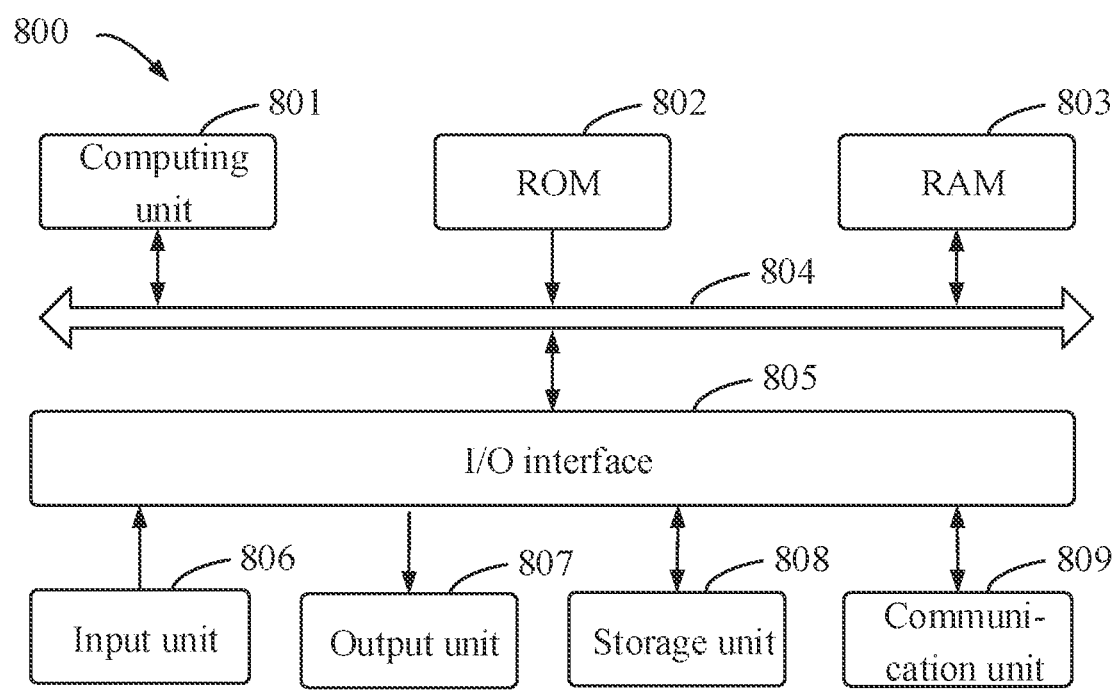
FIG. 8 is a block diagram of an electronic device for implementing a vehicle attitude estimation method according to embodiments of the present disclosure.

FIG. 8 shows a schematic block diagram of an example electronic equipment 800 that may be used to implement the embodiments of the present disclosure. The electronic device is intended to represent various forms of digital computers, such as, a laptop, a desktop, a workstation, a personal digital assistant, a server, a blade server, a mainframe computer, and other suitable computers. The electronic device may also represent various forms of mobile devices, such as, a personal digital processing, a cellular phone, a smart phone, a wearable device and other similar computing devices. Components shown herein, their connections and relationships as well as their functions are merely examples, and are not intended to limit the implementation of the present disclosure described and/or required herein.

As shown in FIG. 8, the electronic device 800 includes a computing unit 801 that may perform various appropriate actions and processes according to a computer program stored in a read only memory (ROM) 802 or a computer program loaded from a storage unit 808 into a random access memory (RAM) 803. In the RAM 803, various programs and data required for an operation of the electronic device 800 may also be stored. The computing unit 801, the ROM 802 and the RAM 803 are connected to each other through a bus 804. An input/output (I/O) interface 805 is also connected to the bus 804.

A plurality of components in the electronic device 800 are connected to the I/O interface 805, and include an input unit 806 such as a keyboard, a mouse, and the like, an output unit 807 such as various types of displays, speakers, and the like, the storage unit 808 such as a magnetic disk, an optical disk, and the like, and a communication unit 809 such as a network card, a modem, a wireless communication transceiver, and the like. The communication unit 809 allows the electronic device 800 to exchange information/data with other devices through a computer network such as Internet and/or various telecommunication networks.

The computing unit 801 may be various general-purpose and/or special-purpose processing components with processing and computing capabilities. Some examples of the computing unit 801 include, but are not limited to, a central processing unit (CPU), a graphics processing unit (GPU), various dedicated artificial intelligence (AI) computing chips, various computing units running machine learning model algorithms, a digital signal processor (DSP), and any appropriate processors, controllers, microcontrollers, and the like. The computing unit 801 performs various methods and processes described above, for example, the vehicle attitude estimation method. For example, in some embodiments, the vehicle attitude estimation method may be implemented as a computer software program, which is tangibly contained in a machine-readable medium, for example, the storage unit 808. In some embodiments, part or all of the computer program may be loaded into and/or installed on the electronic device 800 via the ROM 802 and/or the communication unit 809. When the computer program is loaded into the RAM 803 and executed by the computing unit 801, one or more steps of the vehicle attitude estimation method described above may be performed. Alternatively, in other embodiments, the computing unit 801 may be configured to perform the vehicle attitude estimation method by any other suitable means (e.g., by means of firmware).

Various implementations of the system and technologies described above herein may be implemented in a digital electronic circuit system, an integrated circuit system, a field programmable gate array (FPGA), an application specific integrated circuit (ASIC), an application special standard product (ASSP), a system on chip (SOC), a load programmable logic device (CPLD), a computer hardware, firmware, software, and/or a combination thereof. These various implementations may include implementing in one or more computer programs that may be executed and/or interpreted on a programmable system including at least one programmable processor. The programmable processor may be a special-purpose or general-purpose programmable processor, and may receive data and an instruction from a storage system, at least one input device, and at least one output device, and transmit data and an instruction to the storage system, the at least one input device, and the at least one output device.

Program codes for implementing the method of the present disclosure may be written in any combination of one or more programming languages. These program codes may be provided to a processor or controller of a general-purpose computer, a special-purpose computer or other programmable data processing device, so that when executed by the processor or controller, the program code enables the functions/operations specified in the flow chart and/or block diagram to be implemented. The program codes may be executed completely on a machine, partially executed on the machine, partially executed on the machine and partially executed on a remote machine or completely executed on the remote machine or server as a separate software package.

In the context of the present disclosure, the machine-readable medium may be a tangible medium that may contain or store a program for use by or in combination with an instruction execution system, an apparatus, or an equipment. The machine-readable medium may be a machine-readable signal medium or a machine-readable storage medium. The machine-readable medium may include, but are not limited to, electronic, magnetic, optical, electromagnetic, infrared, or semiconductor systems, devices, or equipment, or any suitable combination thereof. More specific examples of the machine-readable storage medium may include electrical connections based on one or more lines, a portable computer disk, a hard disk, a random access memory (RAM), a read only memory (ROM), an erasable programmable read only memory (EPROM or flash memory), an optical fiber, a compact disk read only memory (CD-ROM), an optical storage device, a magnetic storage device, or any suitable combination of the above.

In order to provide interaction with a user, the system and technologies described herein may be implemented on a computer. The computer has a display device (e.g., a cathode ray tube (CRT) or a liquid crystal display (LCD) monitor) for displaying information to the user and a keyboard and a pointing device (e.g., a mouse or a trackball) through which the user may provide input to the computer. Other types of apparatuses may also be used to provide interaction with the user. For example, feedback provided to the user may be any form of sensory feedback (e.g., visual feedback, auditory feedback, or tactile feedback), and it is capable of receiving input from the user in any form (including acoustic input, voice input, or tactile input).

The system and technologies described herein may be implemented in a computing system that includes a back-end component (e.g., as a data server), a computing system that includes a middleware component (e.g., as an application server), a computing system that includes a front-end component (e.g., as a user computer with a graphical user interface or a web browser through which the user may interact with the implementation of the system and technologies described herein), or a computing system that includes any combination of the back-end component, the middleware component, or the front-end component. The components of the system may be connected to each other through any form or kind of digital data communication (e.g., a communication network). Examples of the communication network include a local area network (LAN), a wide area network (WAN), and Internet.

A computer system may include a client and a server. The client and the server are generally far away from each other and usually interact through the communication network, and a relationship between the client and the server is generated through computer programs performed on a corresponding computer and having a client-server relationship with each other. The server may also be a server of a distributed system or a server combined with a block chain.

It should be understood that various forms of processes shown above may be used to reorder, add or delete steps. For example, steps described in the present disclosure may be executed in parallel, sequentially, or in a different order, as long as the desired result of the technical solution disclosed in the present disclosure may be achieved, but are not limited herein.

The foregoing specific embodiments do not constitute a limitation to the protection scope of the present disclosure. Those having ordinary skill in the art should understand that various modifications, combinations, sub-combinations and substitutions may be made according to design requirements and other factors. Any modification, equivalent replacement and improvement made within the spirit and principle of the present disclosure should be included in the protection scope of the present disclosure.

What is claimed is:

1. A vehicle attitude estimation method, comprising:
obtaining first target data, based on point cloud data of a vehicle, wherein the first target data is points capable of constituting target surfaces of the vehicle, comprising:
determining second target data from the point cloud data of the vehicle, the second target data being characterized as points capable of constituting a corner of the vehicle;
obtaining a target line based on the second target data, by adopting Principal component analysis, PCA, wherein the target line is capable of constituting an edge of the corner, and parameters of the target line comprise a target length of the target line and a target center point of the target line; and
obtaining the first target data, based on the target line, comprising:
acquiring a target support point set, wherein the target support point set is a set of points in the point cloud data of the vehicle, each of the points satisfies an orthogonal requirement with all of a plurality of points constituting the corner of the vehicle, a quantity of the plurality of points is greater than or equal to a first predetermined threshold, and any two points satisfying the orthogonal requirement is that a cosine of an included angle between normals of the two points is less than a second predetermined threshold;
obtaining a target support point within a predetermined distance from the target center point of the target line from the target support point set, wherein the predetermined distance is a predetermined proportion of the target length of the target line, and the target support point is used as a plane support point of the target line; and
performing region growth processing with the target support point as a starting point by adopting a preset region growth mode, to obtain all plane support points constituting each target surface of the target surfaces of the vehicle, wherein the target surface is a body side of the vehicle and the body side of the vehicle is plane;
estimating a bounding box for surrounding the vehicle based on the first target data;
performing attitude estimation on the bounding box for surrounding the vehicle, based on the first target data, to obtain an estimation result of the bounding box, wherein the estimation result of the bounding box comprises a center position of the bounding box and a direction of the bounding box; and
estimating an attitude of the vehicle, based on the estimation result of the bounding box, wherein the attitude of the vehicle comprises a position where the vehicle locates and an orientation of the vehicle.

2. The method of claim 1, wherein performing the attitude estimation on the bounding box for surrounding the vehicle, based on the first target data, to obtain the estimation result of the bounding box, comprises:
performing the attitude estimation on the bounding box based on the first target data, by adopting a preset attitude estimation mode, to obtain the center position of the bounding box and the direction of the bounding box, wherein the preset attitude estimation mode comprises at least one of a coordinate axis parallel bounding box estimation algorithm or a minimum bounding box estimation algorithm; and
taking the center position of the bounding box and the direction of the bounding box as the estimation result of the bounding box.

3. The method of claim 1, wherein estimating the attitude of the vehicle, based on the estimation result of the bounding box, comprises:
obtaining the position where the vehicle locates, based on the center position of the bounding box;
obtaining the orientation of the vehicle, based on the direction of the bounding box; and
taking the position where the vehicle locates and the orientation of the vehicle as the attitude of the vehicle.

4. The method of claim 1, wherein each point of the points capable of constituting the corner of the vehicle is a point in the point cloud data of the vehicle, and a normal of the point satisfies the orthogonal requirement with normals of a plurality of other points within a first predetermined range from the point; wherein a quantity of the plurality of other points is greater than or equal to a third predetermined threshold.

5. The method of claim 4, wherein obtaining the target line based on the second target data, comprises:
analyzing the second target data, to determine the target length of the target line and the target center point of the target line; and
obtaining the target line, based on the target length of the target line and the target center point of the target line.

6. The method of claim 1, wherein determining the second target data from the point cloud data of the vehicle, comprises:
selecting a point from the point cloud data of the vehicle, a normal of the selected point satisfying the orthogonal requirement with normals of a plurality of other points within a first predetermined range from the selected point; wherein a quantity of the plurality of other points is greater than or equal to a third predetermined threshold;
clustering selected points to form at least two point-clusters, by adopting a Euclidean distance-based clustering method; and
determining a target point-cluster with a largest number of points from the at least two point-clusters, wherein points in the target point-cluster are the points capable of constituting the corner of the vehicle.

7. The method of claim 6, wherein obtaining the target line based on the second target data, comprises:
analyzing the second target data, to determine the target length of the target line and the target center point of the target line; and
obtaining the target line, based on the target length of the target line and the target center point of the target line.

8. The method of claim 1, wherein obtaining the target line based on the second target data, comprises:
analyzing the second target data, to determine the target length of the target line and the target center point of the target line; and
obtaining the target line, based on the target length of the target line and the target center point of the target line.

9. The method of claim 1, further comprising:
acquiring three-dimensional point cloud data obtained for a target environment;
acquiring a two-dimensional image obtained for the target environment, wherein the two-dimensional image is an RGB image; and
obtaining the point cloud data of the vehicle, based on the three-dimensional point cloud data and the two-dimensional image, by using fusion of the RGB image and the three-dimensional point cloud data;
wherein at least the vehicle is in the target environment.

10. An electronic device, comprising:
at least one processor; and
a memory communicatively connected to the at least one processor,
wherein the memory stores an instruction executable by the at least one processor, and the instruction is executed by the at least one processor to cause the at least one processor to execute:
obtaining first target data, based on point cloud data of a vehicle, wherein the first target data is points capable of constituting target surfaces of the vehicle, comprising:
determining second target data from the point cloud data of the vehicle, the second target data being characterized as points capable of constituting a corner of the vehicle;
obtaining a target line based on the second target data, by adopting Principal component analysis, PCA, wherein the target line is capable of constituting an edge of the corner, and parameters of the target line comprise a target length of the target line and a target center point of the target line; and
obtaining the first target data, based on the target line, comprising:
acquiring a target support point set, wherein the target support point set is a set of points in the point cloud data of the vehicle, each of the points satisfies an orthogonal requirement with all of a plurality of points constituting the corner of the vehicle, a quantity of the plurality of points is greater than or equal to a first predetermined threshold, and any two points satisfying the orthogonal requirement is that a cosine of an included angle between normals of the two points is less than a second predetermined threshold;
obtaining a target support point within a predetermined distance from the target center point of the target line from the target support point set, wherein the predetermined distance is a predetermined proportion of the target length of the target line, and the target support point is used as a plane support point of the target line; and
performing region growth processing with the target support point as a starting point by adopting a preset region growth mode, to obtain all plane support points constituting each target surface of the target surfaces of the vehicle, wherein the target surface is a body side of the vehicle and the body side of the vehicle is plane;
estimating a bounding box for surrounding the vehicle based on the first target data;
performing attitude estimation on the bounding box for surrounding the vehicle, based on the first target data, to obtain an estimation result of the bounding box, wherein the estimation result of the bounding box comprises a center position of the bounding box and a direction of the bounding box; and
estimating an attitude of the vehicle, based on the estimation result of the bounding box, wherein the attitude of the vehicle comprises a position where the vehicle locates and an orientation of the vehicle.

11. The electronic device of claim 10, wherein performing the attitude estimation on the bounding box for surrounding the vehicle, based on the first target data, to obtain the estimation result of the bounding box, comprises:

performing the attitude estimation on the bounding box based on the first target data, by adopting a preset attitude estimation mode, to obtain the center position of the bounding box and the direction of the bounding box, wherein the preset attitude estimation mode comprises at least one of a coordinate axis parallel bounding box estimation algorithm or a minimum bounding box estimation algorithm; and
taking the center position of the bounding box and the direction of the bounding box as the estimation result of the bounding box.

12. The electronic device of claim 10, wherein estimating the attitude of the vehicle, based on the estimation result of the bounding box, comprises:
obtaining the position where the vehicle locates, based on the center position of the bounding box;
obtaining the orientation of the vehicle, based on the direction of the bounding box; and
taking the position where the vehicle locates and the orientation of the vehicle as the attitude of the vehicle.

13. The electronic device of claim 10, wherein each point of the points capable of constituting the corner of the vehicle is a point in the point cloud data of the vehicle, and a normal of the point satisfies the orthogonal requirement with normals of a plurality of other points within a first predetermined range from the point; wherein a quantity of the plurality of other points is greater than or equal to a third predetermined threshold.

14. The electronic device of claim 10, wherein determining the second target data from the point cloud data of the vehicle, comprises:
selecting a point from the point cloud data of the vehicle, a normal of the selected point satisfying the orthogonal requirement with normals of a plurality of other points within a first predetermined range from the selected point; wherein a quantity of the plurality of other points is greater than or equal to a third predetermined threshold;
clustering selected points to form at least two point-clusters, by adopting a Euclidean distance-based clustering method; and
determining a target point-cluster with a largest number of points from the at least two point-clusters, wherein points in the target point-cluster are the points capable of constituting the corner of the vehicle.

15. The electronic device of claim 10, wherein obtaining the target line based on the second target data, comprises:
analyzing the second target data, to determine the target length of the target line and the target center point of the target line; and
obtaining the target line, based on the target length of the target line and the target center point of the target line.

16. A non-transitory computer-readable storage medium storing a computer instruction thereon, wherein the computer instruction is used to enable a computer to execute:
obtaining first target data, based on point cloud data of a vehicle, wherein the first target data is points capable of constituting target surfaces of the vehicle, comprising:
determining second target data from the point cloud data of the vehicle, the second target data being characterized as points capable of constituting a corner of the vehicle;
obtaining a target line based on the second target data, by adopting Principal component analysis, PCA, wherein the target line is capable of constituting an edge of the corner, and parameters of the target line comprise a target length of the target line and a target center point of the target line; and obtaining the first target data, based on the target line, comprising:

acquiring a target support point set, wherein the target support point set is a set of points in the point cloud data of the vehicle, each of the points satisfies an orthogonal requirement with all of a plurality of points constituting the corner of the vehicle, a quantity of the plurality of points is greater than or equal to a first predetermined threshold, and any two points satisfying the orthogonal requirement is that a cosine of an included angle between normals of the two points is less than a second predetermined threshold;

obtaining a target support point within a predetermined distance from the target center point of the target line from the target support point set, wherein the predetermined distance is a predetermined proportion of the target length of the target line, and the target support point is used as a plane support point of the target line; and performing region growth processing with the target support point as a starting point by adopting a preset region growth mode, to obtain all plane support points constituting each target surface of the target surfaces of the vehicle, wherein the target surface is a body side of the vehicle and the body side of the vehicle is plane;

estimating a bounding box for surrounding the vehicle based on the first target data;

performing attitude estimation on the bounding box for surrounding the vehicle, based on the first target data, to obtain an estimation result of the bounding box, wherein the estimation result of the bounding box comprises a center position of the bounding box and a direction of the bounding box; and estimating an attitude of the vehicle, based on the estimation result of the bounding box, wherein the attitude of the vehicle comprises a position where the vehicle locates and an orientation of the vehicle.

17. The non-transitory computer-readable storage medium of claim 16, wherein performing the attitude estimation on the bounding box for surrounding the vehicle, based on the first target data, to obtain the estimation result of the bounding box, comprises:

performing the attitude estimation on the bounding box based on the first target data, by adopting a preset attitude estimation mode, to obtain the center position of the bounding box and the direction of the bounding box, wherein the preset attitude estimation mode comprises at least one of a coordinate axis parallel bounding box estimation algorithm or a minimum bounding box estimation algorithm; and taking the center position of the bounding box and the direction of the bounding box as the estimation result of the bounding box.

18. The non-transitory computer-readable storage medium of claim 16, wherein estimating the attitude of the vehicle, based on the estimation result of the bounding box, comprises:

obtaining the position where the vehicle locates, based on the center position of the bounding box;

obtaining the orientation of the vehicle, based on the direction of the bounding box; and taking the position where the vehicle locates and the orientation of the vehicle as the attitude of the vehicle.

19. The non-transitory computer-readable storage medium of claim 16, wherein each point of the points capable of constituting the corner of the vehicle is a point in the point cloud data of the vehicle, and a normal of the point satisfies the orthogonal requirement with normals of a plurality of other points within a first predetermined range from the point; wherein a quantity of the plurality of other points is greater than or equal to a third predetermined threshold.

20. The non-transitory computer-readable storage medium of claim 16, wherein determining the second target data from the point cloud data of the vehicle, comprises:

selecting a point from the point cloud data of the vehicle, a normal of the selected point satisfying the orthogonal requirement with normals of a plurality of other points within a first predetermined range from the selected point; wherein a quantity of the plurality of other points is greater than or equal to a third predetermined threshold;

clustering selected points to form at least two point-clusters, by adopting a Euclidean distance-based clustering method; and determining a target point-cluster with a largest number of points from the at least two point-clusters, wherein points in the target point-cluster are the points capable of constituting the corner of the vehicle.

* * * * *